United States Patent [19]
Zalewski et al.

[11] Patent Number: 5,573,266
[45] Date of Patent: Nov. 12, 1996

[54] VEHICLE BODY LOWERING SYSTEM

[75] Inventors: Wojciech T. Zalewski, Belmont; Guy Steele, Shrewsbury, both of Mass.; Christopher J. Mackenzie, Chandler, Ariz.

[73] Assignee: Safe-T-Vans, Inc., Cambridge, Mass.

[21] Appl. No.: 387,474

[22] Filed: Feb. 13, 1995

[51] Int. Cl.$^6$ .................................................. B60G 11/26
[52] U.S. Cl. .......................................... 280/704; 280/6.12
[58] Field of Search .......................... 280/840, 6.1, 6.11, 280/6.12, 704; 254/418, 423, 426

[56] References Cited

U.S. PATENT DOCUMENTS

| | | | |
|---|---|---|---|
| 3,218,088 | 11/1965 | Nallinger et al. | 280/840 |
| 3,314,685 | 4/1967 | Bothwell | 280/840 |
| 3,871,465 | 3/1975 | Nichols | 180/24.02 |
| 4,213,625 | 7/1980 | Hagen | 280/43.23 |
| 4,518,057 | 5/1985 | McCallum | 180/210 |
| 4,763,953 | 8/1988 | Chalin | 280/704 |
| 4,778,324 | 10/1988 | Sawyer | 414/232 |
| 4,958,584 | 9/1990 | Williamson | 280/704 |
| 5,040,832 | 8/1991 | Zalewski | 296/65.1 |
| 5,306,038 | 4/1994 | Henderson, Jr. | 280/688 |

FOREIGN PATENT DOCUMENTS

| | | | |
|---|---|---|---|
| 4001601 | 7/1991 | Germany | 280/704 |
| 4039660 | 12/1991 | Germany | 280/704 |
| 279912 | 11/1988 | Japan | 280/704 |
| 2190335 | 11/1987 | United Kingdom | 280/840 |

*Primary Examiner*—Paul N. Dickson
*Attorney, Agent, or Firm*—Morse, Altman & Benson

[57] ABSTRACT

The vehicle body lowering system of the present invention is installed in a motor vehicle having a wheeled carriage, a cargo/passenger compartment body, a door in the passenger compartment body for cargo loading and unloading or passenger embarking and debarking, and a spring suspension for the buoyant support of the body above the carriage between a lower position and an upper position. The components of the vehicle body lowering system include a drive for forcing the body into the lower position, where the drive comprises a power source and an interconnection between the body and the carriage, and a manually actuated control for energizing and deenergizing the power source. The interconnection is characterized by an operative condition at which the body is in the lower position under the control of the power source, and an inoperative condition at which the body is freely subject to the buoyant support of the spring suspension. The interconnection has at least one coupling to the body and at least one coupling to the carriage.

19 Claims, 10 Drawing Sheets

VEHICLE BODY LOWERING SYSTEM

BACKGROUND OF THE INVENTION

1. Field of the Invention

This invention relates to apparatus for accommodating cargo and disabled persons, and more particularly, to an apparatus for lowering the body of a motor vehicle to allow physically disabled persons to embark and debark comfortably and to allow cargo to be loaded and unloaded easily. The Americans with Disabilities Act (ADA) requires that, by Jan. 26, 1997, all public transportation, including taxis, hotel shuttles, etc., be equipped to accommodate physically disabled person, such as those confined to wheelchairs.

2. The Prior Art

Mechanical difficulties are inherent in providing access between the body of a motor vehicle and the street. Several solutions have been proposed.

These solutions often involve the use of ramps. One problem with a ramp is that the angle of incline of the ramp may be much too steep for carrying heavy cargo easily or for the average wheelchair to traverse easily. A solution to this problem is to modify the vehicle by permanently lowering the vehicle floor. In this case, the ramp traverses the reduced height between the ground and the floor of the vehicle. However, problems arise with this solution. First, the modifications in the vehicle construction necessary to lower the floor of a motor vehicle are substantial. Many components of the vehicle must be repositioned, the existing floor must be removed, and a new floor installed. The time and effort involved are substantial and costly. Also, such redesign involves issues of safety. For example, in some vehicle models, the fuel tank must be relocated. Since the automotive manufacturers locate fuel tanks to be as protected as possible during collisions, moving the fuel tank may make it more susceptible to damage during a collision.

Another safety issue is involved in lowering the floor of the vehicle. Because the floor is permanently lowered, it is more susceptible to "bottoming out," in which case the bottom of the vehicle floor hits the road when going over bumps and potholes. This factor can lead to vehicle control problems, as well as reduction of the maximum load that the vehicle can safely carry. A further safety issue involves the integrity of the vehicle body itself. Many vehicles are designed without a heavy frame on which to mount the body components. They rely instead on the combination of the body components themselves to give structure to the body (the "unibody" construction). The integrity of the unibody may be compromised by removing and replacing a substantial portion of the vehicle floor. The vehicle body may tend to become more susceptible to collapse because it no longer conforms precisely to the manufacturer's design.

An alternative solution is to install a special suspension system by which the body may be lowered. Typically, this type of system may consist of suspension devices that are inflated or deflated by air to raise or lower the floor of the vehicle. The main drawback of a special suspension system is the necessity of replacing or substantially modifying the original factory-installed suspension system, thereby increasing cost and complexity.

Thus, there continues to be a need for a system for lowering the floor of a vehicle to permit a load to ingress and egress easily and comfortably that can overcome the above-described drawbacks of the prior art.

SUMMARY OF THE INVENTION

The object of the present invention is to provide an apparatus for lowering the body of a vehicle so that a load can ingress and egress easily and comfortably while requiring no modification to the body or to the existing spring suspension of the vehicle, thus needing a minimum of time and effort to install and retaining the integrity and safety of the vehicle. The load can be cargo and/or persons, typically physically disabled persons.

The vehicle body lowering system of the present invention is installed in a motor vehicle having a wheeled carriage, a load compartment body, a door in the body for ingress and egress of a load, and a spring suspension for the buoyant support of the body above the carriage between a lower position and an upper position. The components of the vehicle body lowering system include a drive for forcing the body into the lower position, where the drive comprises a power source and an interconnection between the body and the carriage, and a manually actuated control for energizing and deenergizing the power source. The interconnection is characterized by an operative condition at which the body is in the lower position under the control of the power source, and an inoperative condition at which the body is freely subject to the buoyant support of the spring suspension. The interconnection has at least one coupling to the body and at least one coupling to the carriage.

In the preferred embodiment, the interconnection includes a plurality of hydraulic cylinders attached between the body and the carriage such that when the hydraulic cylinders are activated, the body is drawn toward the carriage, compressing the spring suspension, thus causing the vehicle body to lower toward the ground. The power source includes a hydraulic fluid reservoir, a hydraulic pump, a hydraulic line between the reservoir and the pump, and a line between the pump and each of the hydraulic cylinders. In an alternative embodiment, the interconnection includes a plurality of electric motors attached between the body and the carriage such that when the motors are activated, the body is drawn toward the carriage, compressing the spring suspension, thus causing the vehicle body to lower toward the ground. The power source can be integrated into the electrical system of the vehicle and include the vehicle battery, alternator, and electrical wiring.

In the preferred embodiment, the front of the vehicle has two hydraulic cylinders, one for each front wheel. The shell of the cylinder is permanently attached to the vehicle body approximately above a front wheel. The piston of the cylinder is attached to the axle housing near the front wheel by a steel chain. The length of the chain is determined such that it is nearly fully extended when the cylinder and the wheel's spring suspension are fully extended. The pulling power of the cylinder is at least enough to fully compress the wheel's spring suspension when the cylinder is activated. The displacement of the cylinder is at least enough to fully compress the wheel's spring suspension from a fully extended position.

In the preferred embodiment, the rear of the vehicle has two hydraulic cylinders mounted horizontally on the rear axle housing and near the center of the rear axle housing. A steel chain extends from the piston of each cylinder. Each chain is routed about 90° upward toward the body by a pulley mounted near the end of the rear axle housing. The end of the chains are permanently attached to the vehicle body approximately above the corresponding pulley. The length of each chain is such that they are nearly fully extended when the cylinder and the wheel's spring suspension are fully extended. The pulling power of each cylinder is at least enough to fully compress the wheel's spring suspension when the cylinder is activated. The displacement the cylinder is at least enough to fully compress the wheel's spring suspension from a fully extended position.

The manually actuated control includes an electrical switch and control circuitry. In one embodiment, the switch is directly wired to the control circuitry and located inside the body. In another embodiment, the switch is a remote control device, with the transmitter held by the operator and the receiver directly wired to the control circuitry and located in the vehicle. The control circuitry includes a number of safety features, including (1) prohibiting the energizing of the power source unless the switch is manually actuated continuously during the transition from the inoperative condition to the operative condition, (2) prohibiting the energizing of the power source unless the door is open, and (3) in a motor vehicle with an automatic transmission, prohibiting the energizing of the power source unless the automatic transmission is in the "park" position. If the operator fails to maintain the switch in the "on" position, the system will discontinue lowering the vehicle body. If the door is closed when the vehicle body is in a lowered position, the vehicle body lowering system will deactivate, causing the vehicle to resume its normal driving position.

Other objects of the present invention will in part be obvious and will in part appear hereinafter.

BRIEF DESCRIPTION OF THE DRAWINGS

For a fuller understanding of the nature and object of the present invention, reference is made to the accompanying drawings, wherein.

DETAILED DESCRIPTION OF THE PREFERRED EMBODIMENT

The Vehicle Environment of FIGS. 1 to 7

Figure 1:
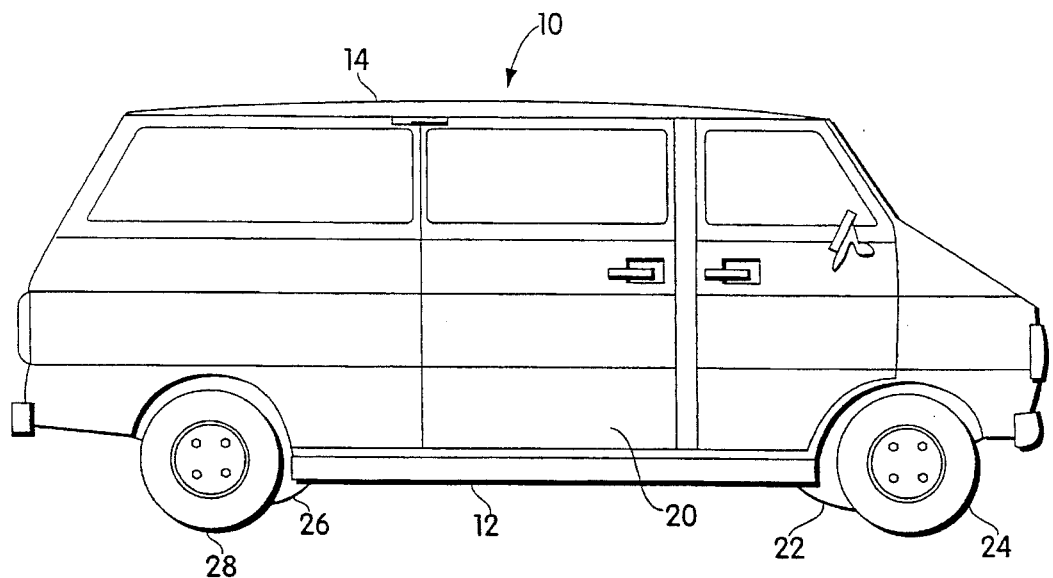
FIG. 1 is a view in profile of a typical mini-van vehicle for carrying cargo or passengers.
Figure 2:
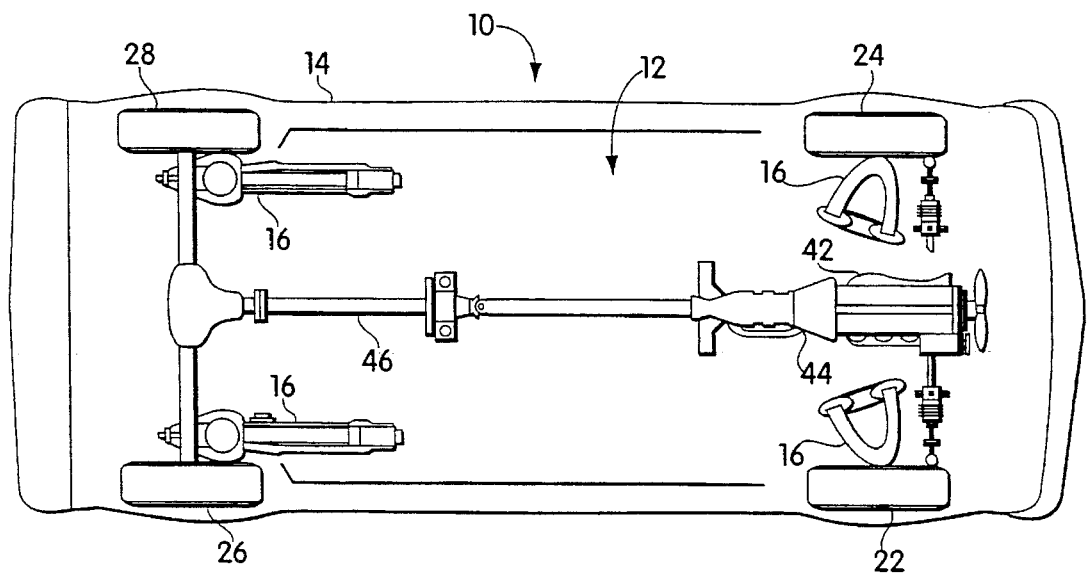
FIG. 2 is a bottom view of the vehicle of FIG. 1.

FIGS. 1 and 2 show a profile and a bottom view of a typical motor vehicle 10: a van used to transport cargo or several passengers. The typical vehicle has a carriage 12, a body 14, and a suspension system 16 that buoyantly supports the body over the carriage.

Figure 3:
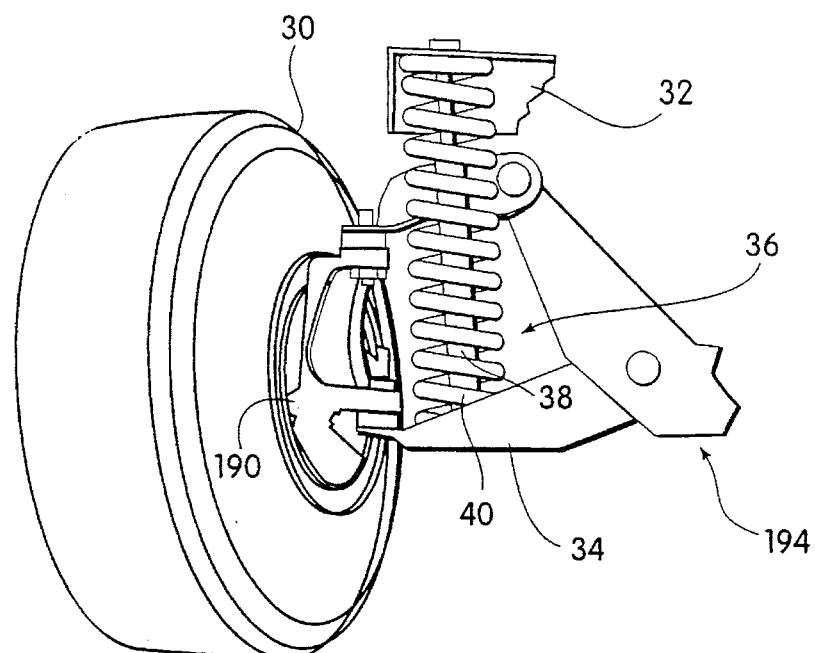
FIG. 3 is a view in relief of a front suspension component of the vehicle of FIG. 1.
Figure 4:
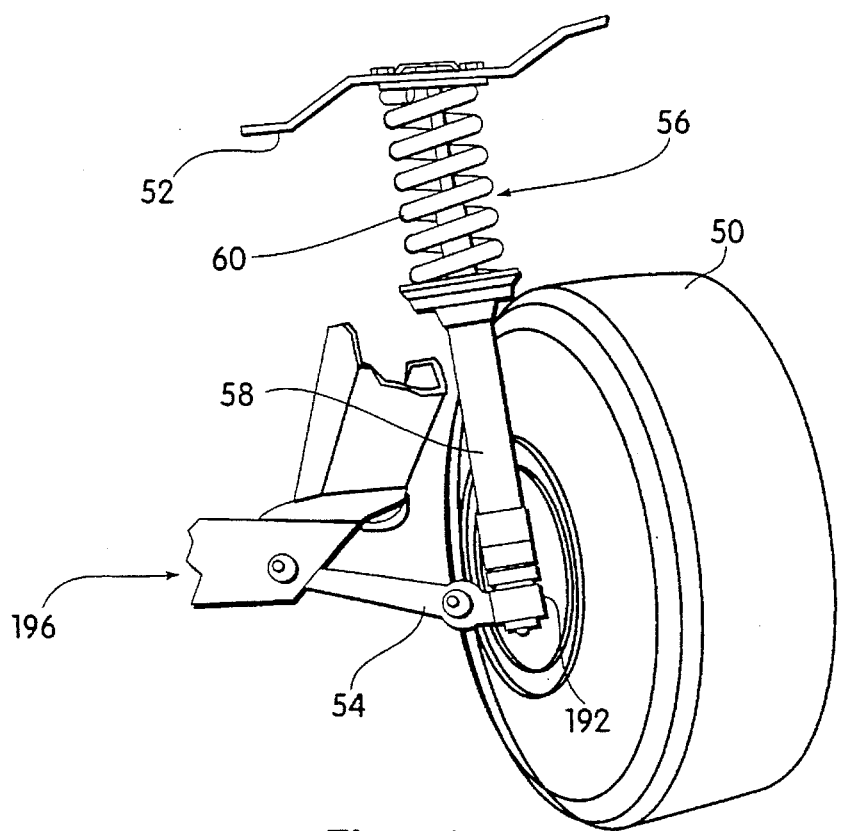
FIG. 4 is a view in relief of an alternate front suspension component of the vehicle of FIG. 1.

FIGS. 2 to 7 illustrate different combinations of carriages, bodies, and suspension systems. The first combination is the rear-wheel-drive vehicle. As illustrated in FIGS. 3 and 4, each of the front wheels 30, 50 is rotationally and pivotally attached 190, 192 to the end of a control arm 34, 54. The component of the suspension system for each front wheel 36, 56 is connected between the corresponding control arm 34, 54 and the underside of the body of the vehicle 32, 52.

Figure 5:
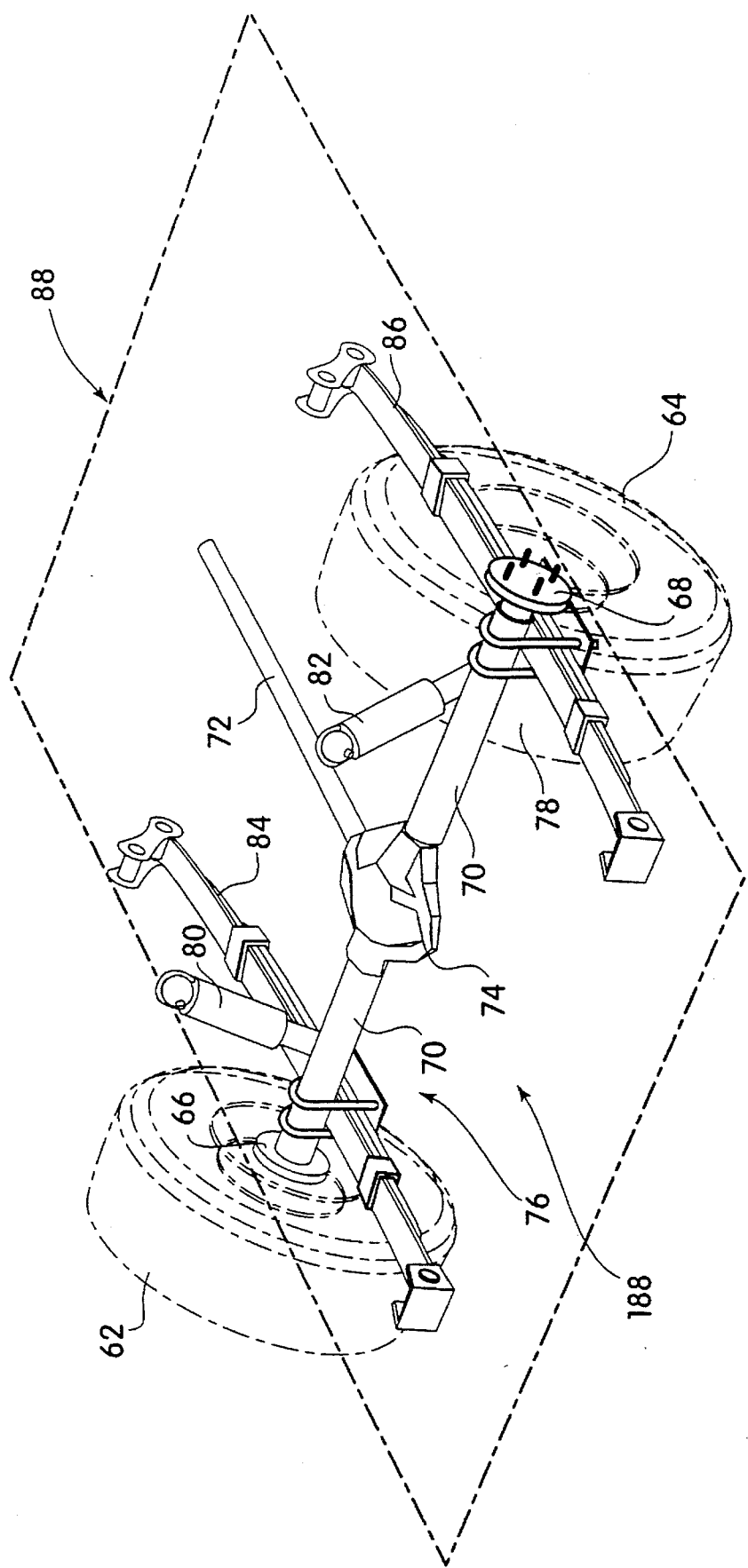
FIG. 5 is a view in relief of a rear suspension of the vehicle of FIG. 1.

As illustrated in FIG. 5, The rear of the rear-wheel drive vehicle typically has two axles 66, 68, one for each wheel 62, 64. The wheel 62, 64 is at one end of an axle 66, 68 and the other end of both axles terminates within the differential 74, the mechanism that transfers the power from the vehicle motor drive shaft 72 to the axles 66, 68 and wheels 62, 64. Surrounding and protecting the axles 66, 68 and differential 74 is the rear axle housing 70. The component of the suspension system for each rear wheel 76, 78 is connected between the rear axle housing 70 near the wheel 62, 64 and the underside of the body of the vehicle 88.

Figure 6:
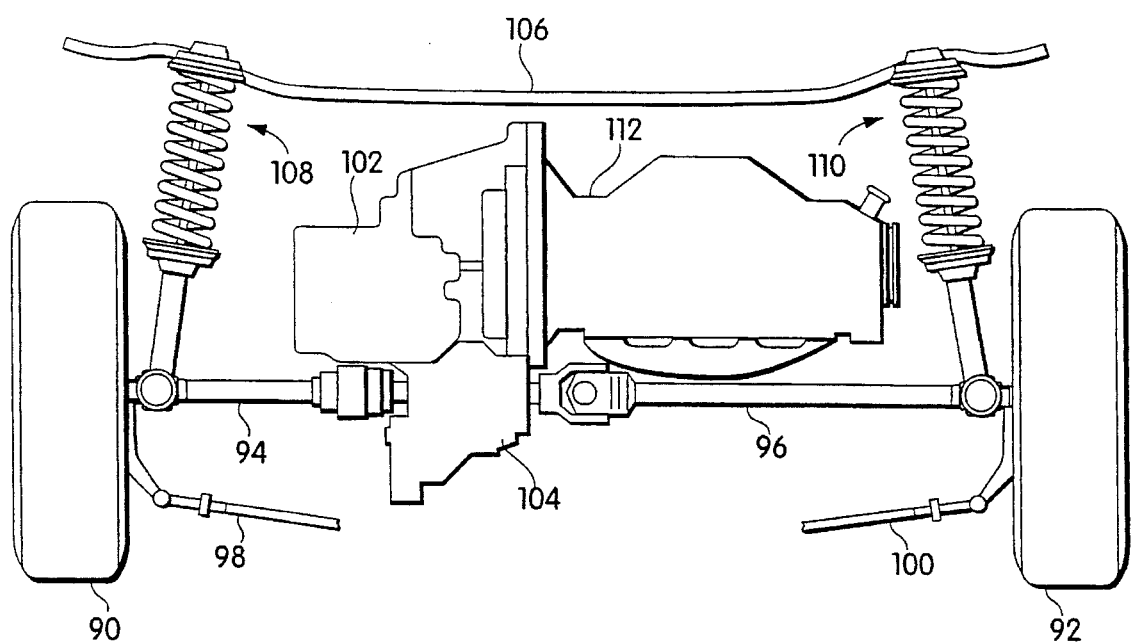
FIG. 6 is a view in relief of the front suspension of a typical front-wheel-drive vehicle.
Figure 7:
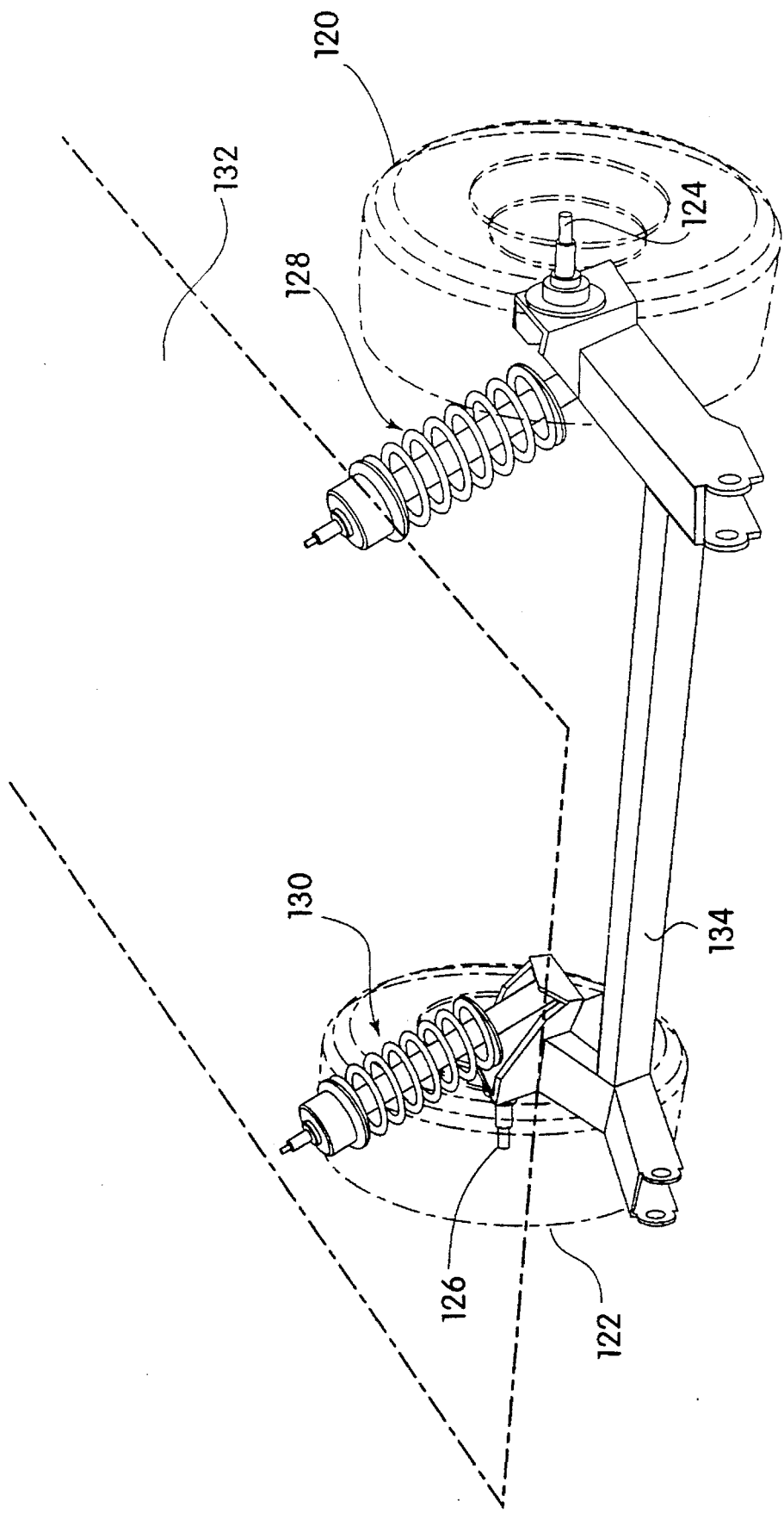
FIG. 7 is a view in relief of the rear suspension of a front-wheel-drive vehicle.

In the second combination, the typical front-wheel-drive vehicle, the front has a structure similar to the front of a rear-wheel-drive vehicle As illustrated in FIG. 6, each of the front wheels 90, 92 is rotationally and pivotally attached to the end of a control arm 98, 100. The component of the suspension system for each front wheel 108, 110 is connected between the corresponding control arm 98, 100 and the underside of the body of the vehicle 106. In addition, there are two axles 94, 96 terminating in a differential 104 and at the wheels 90, 92. The differential 104 transfers power from the engine 112 and transmission 102 to the axles 94, 96 and the wheels 90, 92. One typical rear structure of a front-wheel-drive vehicle is shown in FIG. 7. The rear wheels 120, 122 are rotationally attached at spindles 124, to the ends of a support beam 134. The suspension components 128, 130 connect between the support beam 134 and the underside of the body 132.

In the third combination, the typical four-wheel-drive vehicle, the rear has a structure very similar to the rear of a rear-wheel-drive vehicle illustrated in FIG. 5, and the front of a four-wheel-drive vehicle is very similar in structure to the rear of the vehicle.

In order to refer generically to the various carriage structures available in today's vehicles, this specification will use the generic terms defined in Table 1 for various components of the carriage.

TABLE 1

| Generic term | Rear-wheel-drive vehicle | Front-wheel-drive vehicle | Four-wheel-drive vehicle |
| --- | --- | --- | --- |
| Front axle | The combined front rotational attachments. | The combined front axles. | The combined front axles. |
| Front axle housing | The combined control arms. | The combined control arms. | The front axle housing. |
| Rear axle | The combined rear axles. | The combined rear rotational attachments. | The combined rear axles. |
| Rear axle housing | The rear axle housing. | The rear support beam. | The rear axle housing. |

The body 14 of the vehicle is occupied by the cargo and/or passengers being transported by the vehicle 10. To get in and out of the body, a door 20 is shown. In one alternative embodiment, the door slides, as in, for example, the side door of the typical van. In another alternative embodiment, the door is hinged, as in, for example, the driver's door of the typical passenger automobile.

A suspension system has four assemblies, one for each wheel. As illustrated in FIGS. 3 to 5, an assembly includes a spring 40, 60, 84, 86 and a shock absorber 38, 58, 80, 82. The spring 40, 60, 84, 86 isolates the body of the vehicle from the effects of the road on the carriage and the shock absorber 38, 58, 80, 82 limits the reaction time of the spring 40, 60, 84, 86 to sudden changes in the road surface. The combination of the spring 40, 60, 84, 86 and shock absorber 38, 58, 80, 82 give the cargo and passengers a smoother ride.

There are two types of springs, the coil spring 40, 60 and the leaf spring 84, 86. FIG. 3 shows how the coil spring 40 is mounted in relation to the carriage 194, the body 32, and the shock absorber 38 when the spring 40 and shock absorber 38 are separate units. FIG. 4 show how the coil spring 60 is mounted in relation to the carriage 196, the body 52, and the shock absorber 58 in a strut. FIG. 5 shows how the leaf spring 84, 86 is mounted in relation to the carriage 188, the body 88, and the shock absorber 80, 82.

The Present Invention

In its preferred embodiment, the vehicle body lowering system of the present invention includes a plurality of hydraulic cylinders connected between the carriage and the body, a power source, and a manually actuated control for energizing and deenergizing the power source.

In the preferred embodiment, the vehicle body lowering system uses hydraulic cylinders to substantially fully compress the suspension system of the vehicle, putting the system into its operative state. The system is in its inoperative state when the vehicle lowering system has essentially no effect on the normal operation of the motor vehicle and the suspension system operates normally.

In an alternative embodiment, the vehicle body lowering system of the present invention uses electric motors to substantially fully compress the suspension system of the vehicle, putting the system into its operative state. The system is in its inoperative state when the vehicle lowering system has essentially no effect on the normal operation of the motor vehicle and the suspension system operates normally.

As in FIGS. 8 to 11, the preferred embodiment of the present invention uses four differently configured assemblies of hydraulic cylinders to compress the suspension system. The preferred hydraulic cylinder has two states, its quiescent state, where the piston is extended out of the cylinder body, and its activated state, where the piston is retracted into the cylinder body.

Figure 8:
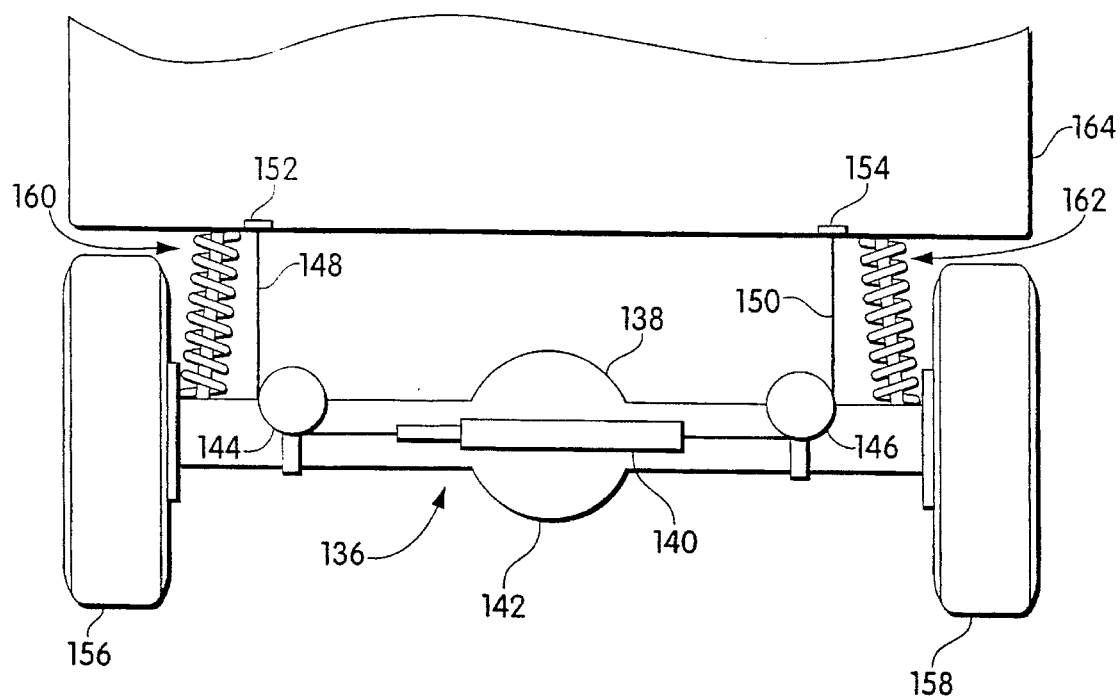
FIG. 8 is an elevational view of the first assembly configuration of the present invention.

The Assembly of FIG. 8

FIG. 8 shows the first assembly configuration 136, which is typically used for the rear of a vehicle 10, but can also be used in the front of a vehicle 10. FIG. 8 illustrates its use in the rear of a vehicle 10. The assembly 136 operates on both rear suspension components 160, 162. The hydraulic cylinder 140 is located horizontally near the center of the rear axle housing 142, but is not mounted. Two pulleys 144, 146 are both mounted on either the front or the rear side of the rear axle housing 142, one near the left wheel 156 and one near the right wheel 158. The pulleys 144, 146 are mounted so that their axes of rotation are substantially perpendicular to the rear axle housing 142 and substantially perpendicular to the plane of motion of the vehicle 10. The end of a flexible, constant length line 148, 150 is fastened to each end of the cylinder 140. Each line 148, 150 is routed through one of the pulleys 144, 146 at approximately a 90° angle and permanently fastened to the underside of the vehicle body 164 at 152, 154 approximately above the corresponding pulley 144, 146. In the preferred embodiment, the lines 148, 150 are steel chains and the lengths of the lines 148, 150 are such that they are substantially completely extended when the cylinder 140 and both rear suspension components 160, 162 are fully extended. The cylinder 140 is held in position by the tension in the lines 148, 150 created by the preferred length of the lines 148, 150. The power and displacement of the cylinder 140 is at least enough to substantially fully compress both rear suspension components 160, 162 from a fully extended position.

Figure 9:
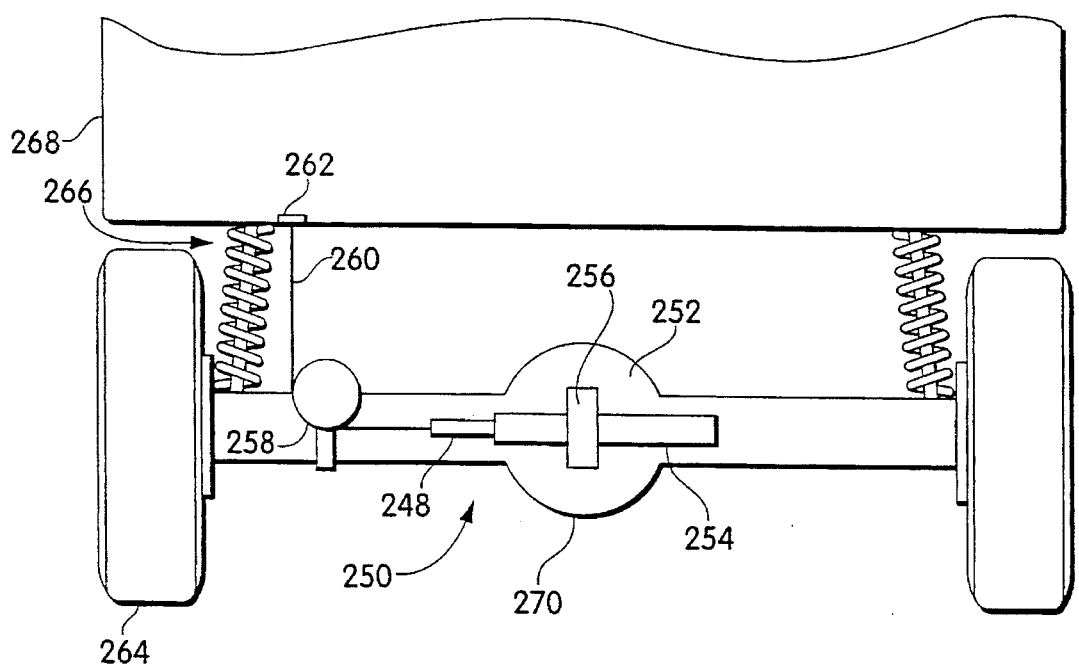
FIG. 9 is an elevational view of the second assembly configuration of the present invention.

The Assembly of FIG. 9

FIG. 9 shows the second assembly configuration 250, which is typically used for the rear of a vehicle 10, but can also be used in the front of a vehicle 10. FIG. 9 illustrates its use in the rear of a vehicle 10. The assembly 250 operates on one rear suspension component 266, which can be associated with either wheel. A hydraulic cylinder 254 is permanently mounted horizontally 256 near the center of the rear axle housing 252. A pulley 258 is mounted on rear axle housing 270 near the wheel 264. The pulley 258 is mounted so that its axis of rotation is substantially perpendicular to the rear axle housing 270 and substantially perpendicular to the plane of motion of the vehicle 10. The end of a flexible, constant length line 260 is fastened to the end of the piston 248 of the cylinder 254. The line 260 is routed through the pulley 258 at approximately a 90° angle and permanently fastened to the underside of the vehicle body 268 at 262 approximately above the corresponding pulley 258. In the preferred embodiment, the line 260 is a steel chain and the length of the line 260 is such that it is substantially completely extended when the cylinder 254 and the suspension component 266 are fully extended. The power and displacement of the cylinder 254 is at least enough to compress the suspension component 266 substantially completely from a fully extended position.

Figure 10:
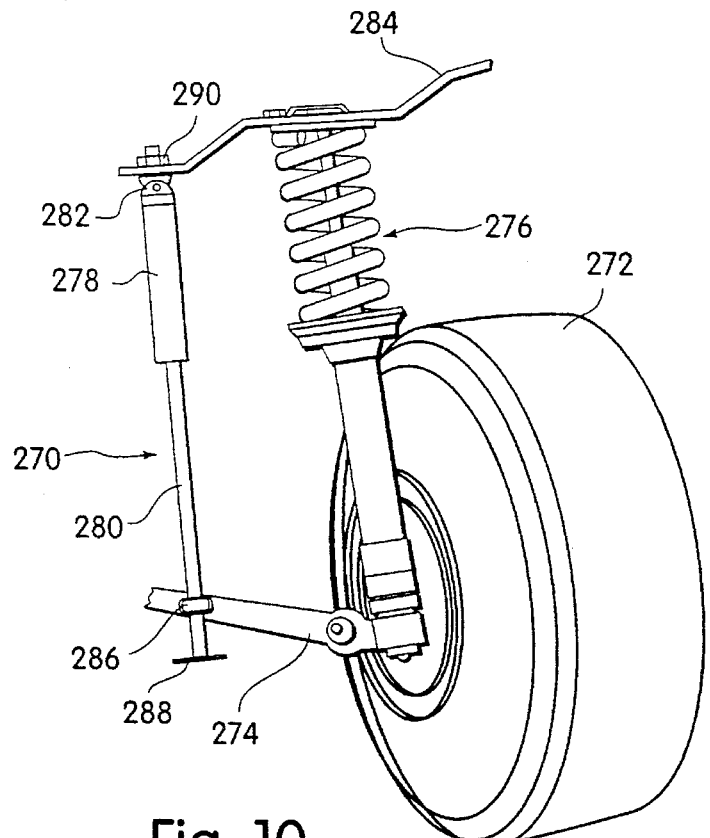
FIG. 10 is an view in relief of the third assembly configuration of the present invention.

The Assembly of FIG. 10

FIG. 10 shows the third assembly configuration 270, which is typically used for the front of a vehicle 10, but may be used for the rear of a vehicle 10. This assembly 270 operates on one front suspension component 276. The upper end of a hydraulic cylinder 278 is mounted by a universal joint 282 to the underside of the body 284 so that the cylinder 278 can swivel about the mounting 290. The piston 280 of the cylinder 278 extends through an opening 286 in the control arm 274 and is terminated by a plate 288 which is larger than the opening 286, thus precluding the end of the piston 280 from retracting through the opening 286. In the preferred embodiment, the length of the piston 280 is such that the end plate 288 is nearly in contact with the rim of the opening 286 when cylinder 278 and the suspension component are fully extended. The power and displacement of the cylinder 278 is at least enough to compress the suspension component 276 substantially completely from a fully extended position.

Figure 11:
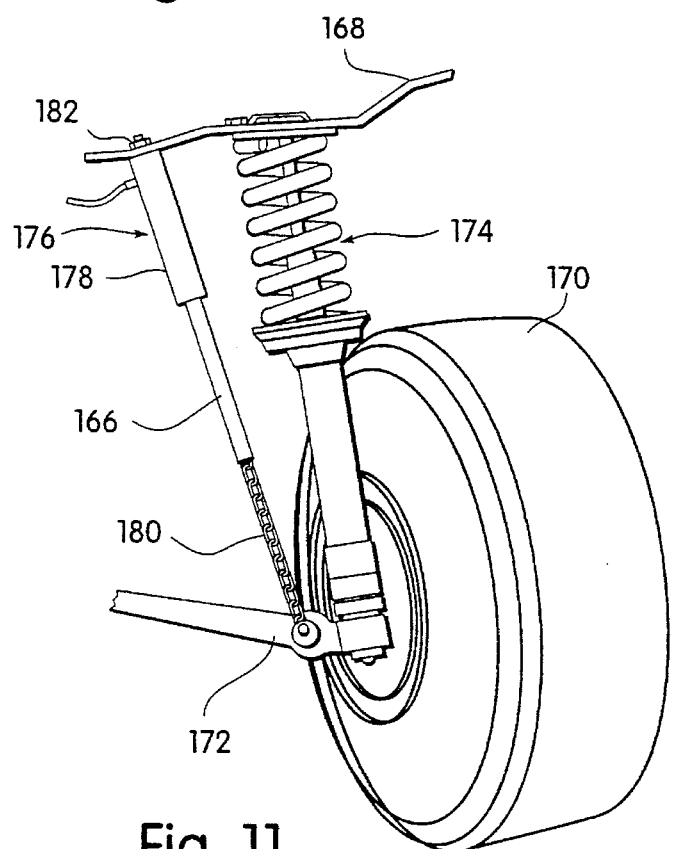
FIG. 11 is a view in relief of the fourth assembly configuration of the present invention.

The Assembly of FIG. 11

FIG. 11 shows the fourth assembly configuration 176, which is typically used for the front of a vehicle 10, but may be used for the rear of a vehicle 10. This assembly 176 operates on one front suspension component 174. The upper end of a hydraulic cylinder 178 is mounted to the underside of the body 168 at 182 so that the cylinder 178 is no more than 45° from vertical. The end of the cylinder piston 166 is suspended above the control arm 172 near a front wheel 170 and remains above the control arm 172 when the suspension component 174 is fully compressed. A flexible, constant length line 180 connects the end of the piston 166 to the control arm 172 near the wheel 170. In the preferred embodiment, the line 180 is a steel chain and the length of the line 180 is such that it is substantially completely extended when the cylinder 178 and the suspension component 174 are fully extended. The power and displacement of the cylinder 178 is at least enough to compress the suspension component 174 substantially completely from a fully extended position.

Figure 12:
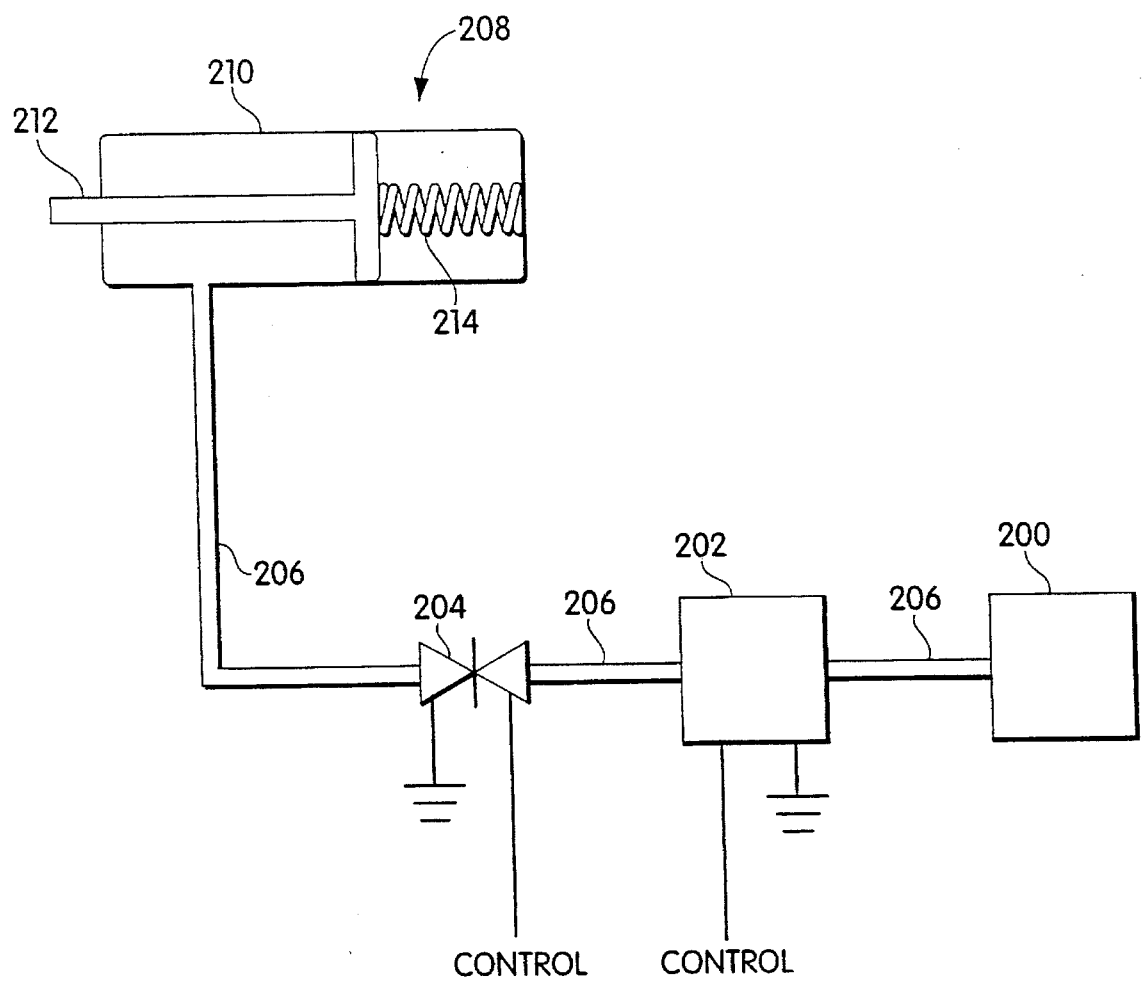
FIG. 12 is a schematic diagram of the hydraulic power source.

The Power Source of FIG. 12

In the preferred embodiment, where the lowering of the body is performed by hydraulic cylinders, the power source is a source of pressurized hydraulic fluid. As in FIG. 12, this source includes a hydraulic fluid reservoir 200, a hydraulic pump 202, a normally open hydraulic valve 204, and hydraulic lines 206 connecting the reservoir 200, pump 202, valve 204, and hydraulic cylinders 208. When the body lowering system is in its inoperative condition, the valve 204 is open and the fluid is stored in the reservoir 200. When the system is energized and is in transition from its inoperative condition to its operative condition, the pump 202 is activated to force fluid through the open valve 204 from the reservoir 200 into the hydraulic cylinder 208 via the hydraulic lines 206, causing the cylinder piston 212 to retract into the cylinder shell 210. When the system reaches its operative condition, the pump 202 is deactivated and the valve 204 is closed in order to maintain fluid pressure to keep the piston 212 retracted into the shell 210.

When the system is deenergized, the valve 204 is opened and the action of the vehicle suspension system 16 returning to its normal position forces the hydraulic fluid back into the reservoir 200, returning the piston 212 to its quiescent extended state. Alternatively, when the system is deenergized, the valve 204 is opened and a biasing mechanism internal to the cylinder 214, for example, a spring, forces the piston 212 to return to its quiescent extended state.

Figure 13:
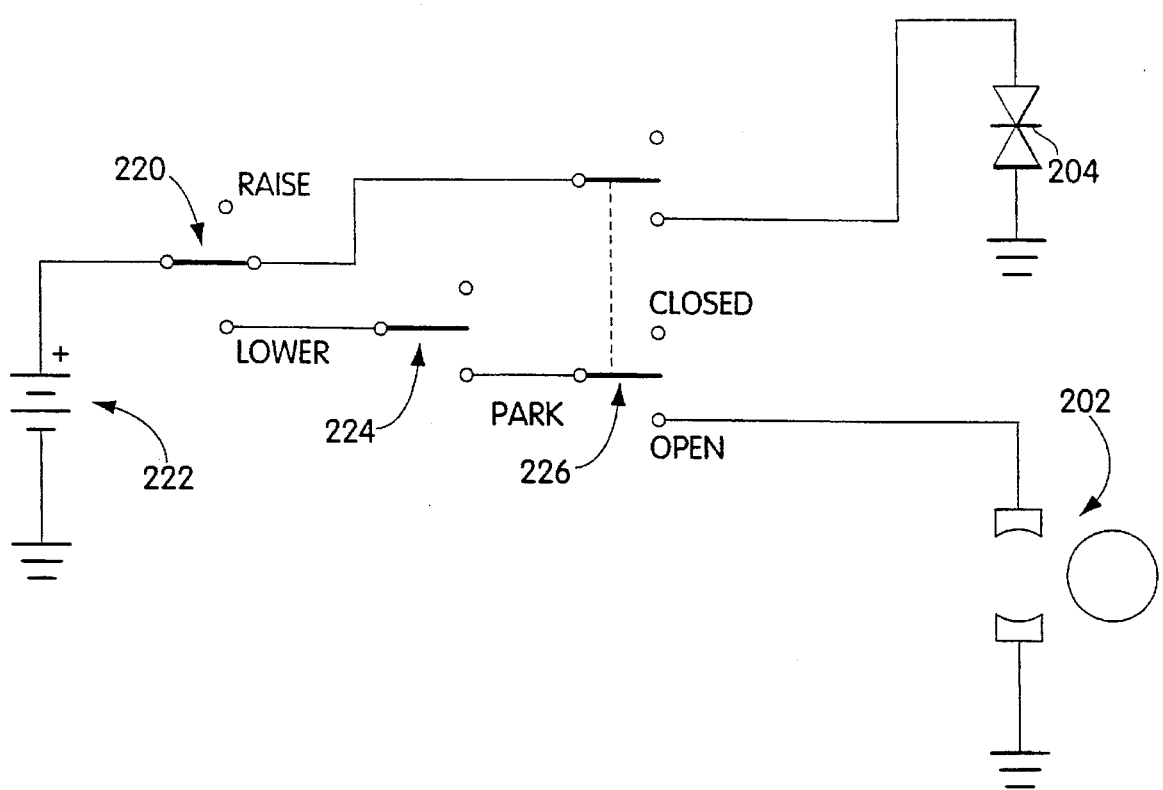
FIG. 13 is an electrical schematic of the control circuitry.

The Manually Actuated Control of FIG. 13

An electrical schematic of the manually actuated control is shown in FIG. 13. The control includes a manually actuated electrical switch 220 and control circuitry. In one embodiment, the manually actuated switch 220 is directly connected to the control circuitry and located inside the body 14 in close proximity to the door 20. In another embodiment, the manual switch 220 is a remote control device, with the physical switch located on a remote transmitter held by the operator and a receiver located in the vehicle and directly wired to the control circuitry.

The vehicle battery 222 supplies electrical power to the hydraulic pump 202 and hydraulic valve 204 through a number of electrical switches. The valve 204 is only closed when the door 20 is open and the manual switch 220 is in its center position. The pump 202 is on only when the manual switch 220 is in its down or "lower" position, the transmission 44 is in "park", and the door 20 is open.

The manual switch 220 is a momentary contact switch, which means that the manual switch 220 must be manually held in the "lower" position continuously during the transition from the inoperative condition to the operative condition. If the switch 220 is released before reaching the operative position, the pump 202 is deactivated, causing the system to maintain the position it was in when the manual switch 220 was released.

Another condition to energizing the system is that the automatic transmission 44 of the vehicle be in the "park" position. If the transmission 44 is not in "park", as determined by switch 224, the system will not energize. If the transmission 44 is removed from "park" during the transition from the inoperative condition to the operative condition, the pump 202 is deactivated, but the valve 204 remains deactivated, causing the system to return to the inoperative position.

The last condition to energizing the system is that the door 20 is open. If the door 20 is not open, as determined by switch 226, neither the pump 202 nor the valve 204 will be energized. If the door 20 is closed during the transition from the inoperative condition to the operative condition, the pump 202 is deactivated and the valve 204 is opened, causing the system to deenergize and return to the inoperative condition. Preferably, this condition is only installed in vehicles using the present invention for allowing disabled persons to embark and debark, not for vehicles using the present invention for loading and unloading cargo.

The center position of the manual switch 220 activates the valve 204 if the door 20 is open.

When the manual switch 220 is held in the upper or "raise" position, the valve 204 is deactivated, allowing the fluid to return the reservoir 200 and causing the system to return to its inoperative condition.

OPERATION

Figure 14:
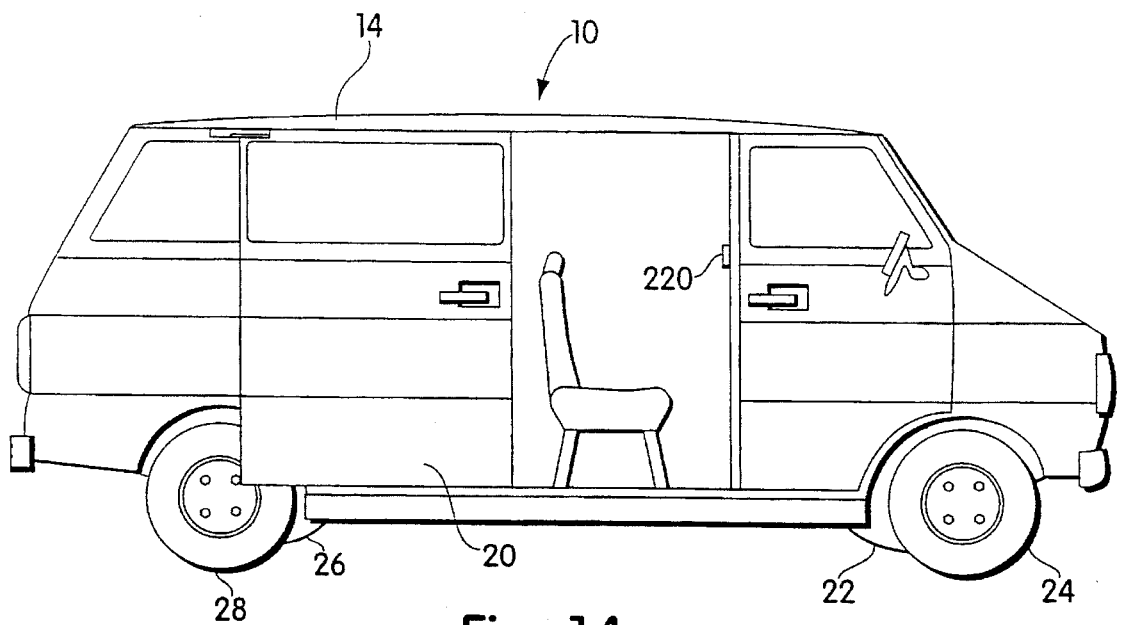
FIG. 14 is a profile of the vehicle of FIG. 1 with the present invention in its inoperative condition.
Figure 15:
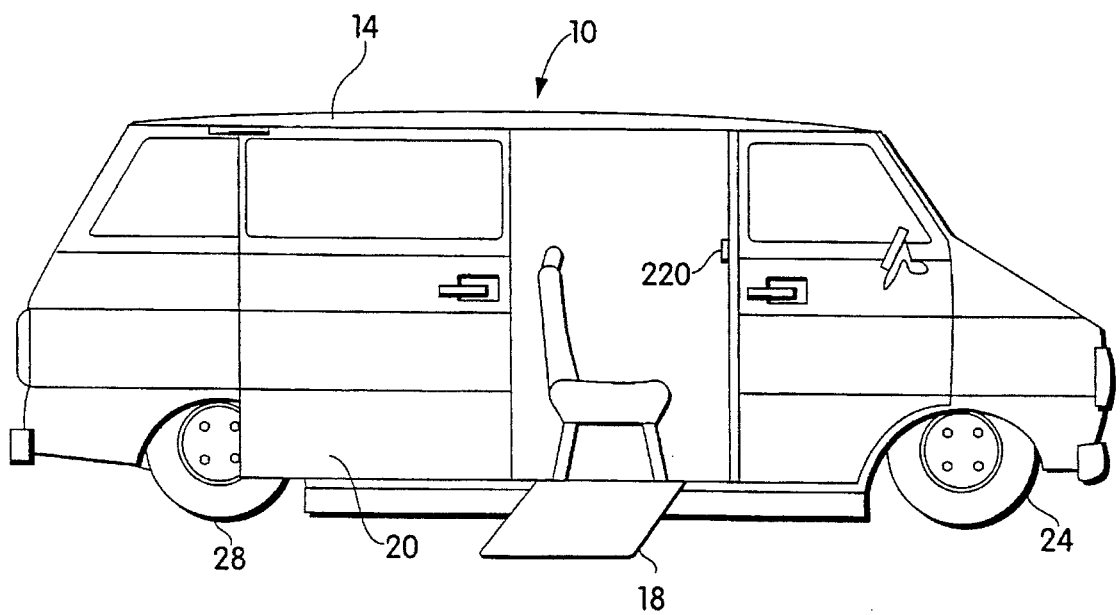
FIG. 15 is a profile of the vehicle of FIG. 1 with the present invention in its operative condition.

The operation of the present invention configured to allow a disabled person to embark or debark is illustrated in FIGS. 14 and 15. To operate the present invention, the vehicle door 20 must be open and the transmission 44 must be in "park". The operator presses and holds the manually actuated switch 220 in the down or "lower" position. The system of the present invention energizes, compressing the suspension system 16 of the vehicle 10, causing the vehicle body 14 to lower toward the ground. If the disabled person wishing to embark or debark does not require the vehicle body 14 to be lower to the ground, the person embarks or debarks. If the person wishing to embark or debark is still unable to do so with the suspension system 16 fully compressed, a ramp 18 is extended from the door 20 for addition assistance in embarking or debarking.

When the operator wishes to return the vehicle to its normal operating condition, the operator presses and holds the manually actuated switch 220 in the up or "raise" position. The system of the present invention deenergizes, causing the suspension system 16 to return to it normal condition.

What is claimed is:

1. In a motor vehicle having a carriage including at least one axle and an axle housing, a load compartment body, and a spring suspension component at each of said axles for the buoyant support of said body above said carriage between a lower position and an upper position, an assembly for facilitating ingress and egress of a load from said motor vehicle, comprising:

(a) a hydraulic cylinder having a shell and a piston extending from one end of said shell, said cylinder located substantially horizontally and adjacent to said axle housing;

(b) a power source;

(c) a manually actuated control for energizing and deenergizing said power source;

(d) a first pulley mounted on said axle housing to the one side of said cylinder;

(e) a second pulley mounted on said axle housing to the other side of said cylinder;

(f) said first and second pulleys being oriented such that their axes of rotation are substantially perpendicular to said axle and substantially perpendicular to the plane of motion of said motor vehicle;

(g) a first flexible, substantially constant length line connected at one end to one end of said cylinder, directed by said first pulley, and attached to said vehicle body approximately above said first pulley such that, when said power source is deenergized, said vehicle body is freely subject to said buoyant support; and (h) a second flexible, substantially constant length line connected at one end to the other end of said cylinder, directed by said second pulley, and attached to said vehicle body approximately above said second pulley such that, when said power source is deenergized, said vehicle body is freely subject to said buoyant support;

(i) whereby, when said assembly is activated, said piston retracts into said shell, pulling said lines, and causing said spring suspension components to compress, thus lowering said vehicle body at said axle.

2. The assembly of claim 1, wherein said lines are chains.

3. The assembly of claim 1, wherein the pulling power of said cylinder is at least the amount of power necessary to fully compress said spring suspension components.

4. The assembly of claim 1, wherein said first and second lines have a length such that said lines are nearly fully extended when said cylinder and said spring suspension component are fully extended, and the displacement of said cylinder is at least long enough to fully compress said spring suspension components.

5. In a motor vehicle having a carriage including at least one axle and an axle housing, a load compartment body, and a spring suspension component at said axle for the buoyant support of said body above said carriage between a lower position and an upper position, an assembly for facilitating ingress and egress of a load from said motor vehicle, comprising:

(a) a hydraulic cylinder having a shell and a piston extending from one end of said shell, said shell mounted approximately horizontally on said carriage;

(b) a power source;

(c) a manually actuated control for energizing and deenergizing said power source;

(d) a pulley mounted on said axle housing;

(e) said pulley being oriented such that its axis of rotation is substantially perpendicular to said axle and substantially perpendicular to the plane of motion of said motor vehicle;

(f) a flexible, substantially constant length line connected at one end to said piston, directed by said pulley, and attached to said vehicle body approximately above said pulley such that, when said power source is deenergized, said vehicle body is freely subject to said buoyant support; and (g) whereby, when said assembly is activated, said piston retracts into said shell, pulling said line, and causing said spring suspension component to compress, thus lowering said vehicle body at said axle.

6. The assembly of claim 5, wherein said line is a chain.

7. The assembly of claim 5, wherein the pulling power of said cylinder is at least the amount of power necessary to fully compress said spring suspension component.

8. The assembly of claim 5, wherein said line has a length such that said line is nearly fully extended when said cylinder and said spring suspension component are fully extended, and the displacement of said cylinder is at least long enough to fully compress said spring suspension component.

9. In a motor vehicle having a carriage including at least one axle, a wheel at the end of said axle, and an axle housing, a load compartment body, and a spring suspension component near each of said wheels for the buoyant support of said body above said carriage between a lower position and an upper position, an assembly for facilitating ingress and egress of a load from said motor vehicle, comprising:

(a) a hydraulic cylinder having a shell and a piston extending from said shell;

(b) a power source;

(c) a manually actuated control for energizing and deenergizing said power source;

(d) a means for permanently anchoring an end of said shell to the underside of said vehicle body at an anchor point such that said shell can swivel about said anchor point; and (e) said axle housing having an aperture through which said piston extends, and a means for precluding said piston from retracting completely through said aperture;

(f) whereby, when said assembly is activated, said piston retracts into said shell, pulling said axle housing, and causing said spring suspension component to compress, thus lowering said vehicle body at said wheel.

10. The assembly of claim 9, wherein the pulling power of said assembly is at least the amount of power necessary to fully compress said spring suspension component.

11. The assembly of claim 9, wherein the length of said piston is such that said piston is fully extended from said shell when said spring suspension component is fully extended, and the displacement of said cylinder is at least long enough to fully compress said spring suspension component.

12. The assembly of claim 9, wherein said swiveling means is a universal joint.

13. In a motor vehicle having a carriage including at least one axle, a wheel at the end of said axle, and an axle housing, a load compartment body, and a spring suspension component near each of said wheels for the buoyant support of said body above said carriage between a lower position and an upper position, an assembly for facilitating ingress and egress of a load from said motor vehicle, comprising:

(a) a hydraulic cylinder having a shell and a piston extending from said shell;

(b) a power source;

(c) a manually actuated control for energizing and deenergizing said power source;

(d) a means for permanently anchoring an end of said shell to the underside of said vehicle body at an anchor point such that the direction of travel of said piston is less than or equal to approximately 45° from vertical; and (e) a flexible, constant length line having a first end being fastened to said piston, and a second end being attached to said axle housing near said wheel;

(f) whereby, when said assembly is activated, said piston retracts into said shell, pulling said flexible attachment means, and causing said spring suspension component to compress, thus lowering said vehicle body at said wheel.

14. The assembly of claim 13, wherein said line is a chain.

15. The assembly of claim 13, wherein said line has a length such that said line is nearly fully extended when said cylinder and said spring suspension component are fully extended, and the displacement of said cylinder is at least long enough to fully compress said spring suspension component.

16. In a motor vehicle having a carriage including a rear axle, a front axle, a wheel at each end of each of said axles, a rear axle housing, and a front axle housing, a load compartment body, at least a door in said body for ingress and egress of a load, and a spring suspension component near each of said wheels for the buoyant support of said body above said carriage between a lower position and an upper position, a system for facilitating ingress and egress of said load from said motor vehicle, comprising:

(a) a power source;

(b) a manually actuated control for energizing and deenergizing said power source;

(c) a pair of front assemblies and a pair of rear assemblies;

(d) each of said assemblies including a hydraulic cylinder having a shell and a piston, and a substantially constant length chain;

(e) an end of each of said shells being permanently attached to the underside of said body near each of said wheels such that the direction of travel of said piston is less than or equal to approximately 45° from vertical;

(f) a first end of each of said chains being attached to the end of one of each of said pistons;

(g) a second end of each of said chains being attached to one of said axle housings near the closest of said wheels;

(h) the length of each of said chains being such that said chain is nearly fully extended when said corresponding cylinder and said corresponding suspension component are fully extended;

(i) the displacement of each of said cylinders being at least long enough to fully compress said corresponding suspension component;

(j) the pulling power of each of said cylinders being at least the amount of power necessary to fully compress said corresponding suspension component;

(k) said power source including a means for pumping hydraulic fluid into and out of said hydraulic cylinders;

(l) said manually actuated control including an electrical switch and control circuitry;

(m) whereby, when said system is activated, said cylinders pull said chains, causing said suspension components to compress, thus lowering said vehicle body.

17. In a motor vehicle having a carriage including a rear axle, a front axle, a wheel at each end of each of said axles, a rear axle housing, and a front axle housing, a load compartment body, at least a door in said body for ingress and egress of a load, and a spring suspension component near each of said wheels for the buoyant support of said body above said carriage between a lower position and an upper position, a system for facilitating ingress and egress of said load from said motor vehicle, comprising:

(a) a power source;

(b) a manually actuated control for energizing and deenergizing said power source;

(c) a pair of front assemblies and a pair of rear assemblies;

(d) each of said assemblies including a hydraulic cylinder having a shell and a piston, a pulley, and a substantially constant length chain;

(e) said cylinders being mounted substantially horizontally on said carriage;

(f) each of said pulleys being mounted on said axle housings near one of each of said wheels;

(g) said pulleys being oriented such that their axes of rotation are substantially perpendicular to said axles and substantially perpendicular to the plane of motion of said motor vehicle;

(h) a first end of each of said chains being attached to the end of one of each of said pistons;

(i) each of said chains being directed by one of said pulleys and attached to the underside of said body approximately above said wheel corresponding to said pulley;

(j) the length of each of said chains being such that said chain is nearly fully extended when said corresponding cylinder and said corresponding suspension component are fully extended;

(k) the displacement of each of said cylinders being at least long enough to fully compress said corresponding suspension component;

(l) the pulling power of each of said cylinders being at least the amount of power necessary to fully compress said corresponding suspension component;

(m) said power source including a means for pumping hydraulic fluid into and out of said hydraulic cylinders;

(n) said manually actuated control including an electrical switch and control circuitry;

(o) whereby, when said system is activated, said cylinders pull said chains, causing said suspension components to compress, thus lowering said vehicle body.

18. In a motor vehicle having a carriage including a rear axle, a front axle, a wheel at each end of each of said axles, a rear axle housing, and a front axle housing, a load compartment body, at least a door in said body for ingress and egress of a load, and a spring suspension component near each of said wheels for the buoyant support of said body above said carriage between a lower position and an upper position, a system for facilitating ingress and egress of said load from said motor vehicle, comprising:

(a) a power source;

(b) a manually actuated control for energizing and deenergizing said power source;

(c) a pair of front assemblies and a pair of rear assemblies;

(d) each of said front assemblies including a hydraulic cylinder having a shell and a piston, and a substantially constant length chain;

(e) an end of each of said front shells being permanently attached to the underside of said body near each of said front wheels;

(f) a first end of each of said front chains being attached to the end of one of each of said front pistons;

(g) a second end of each of said front chains being attached to said front axle housing near the closest of said front wheels;

(h) each of said rear assemblies including a hydraulic cylinder having a shell and a piston, a pulley, and a substantially constant length chain;

(i) said rear cylinders being mounted substantially horizontally on said carriage;

(j) each of said rear pulleys being mounted on said rear axle housing near one of each of said rear wheels;

(k) said rear pulleys being oriented such that their axes of rotation are substantially perpendicular to said rear axle and substantially perpendicular to the plane of motion of said motor vehicle;

(l) a first end of each of said rear chains being attached to the end of one of each of said rear pistons;

(m) each of said rear chains being directed by one of said rear pulleys and attached to the underside of said body approximately above said rear wheel corresponding to said rear pulley;

(n) the length of each of said chains being such that said chain is nearly fully extended when said corresponding cylinder and said corresponding suspension component are fully extended;

(o) the displacement of each of said cylinders being at least long enough to fully compress said corresponding suspension component;

(p) the pulling power of each of said cylinders being at least the amount of power necessary to fully compress said corresponding suspension component;

(q) said power source including a means for pumping hydraulic fluid into and out of said hydraulic cylinders;

(r) said manually actuated control including an electrical switch and control circuitry;

(s) whereby, when said system is activated, said cylinders pull said chains, causing said suspension components to compress, thus lowering said vehicle body.

19. In a motor vehicle having a carriage including a rear axle, a wheel at each end of said axle, a rear axle housing, a cargo compartment body, at least a door in said body for cargo loading and unloading, and a spring suspension component near each of said wheels for the buoyant support of said body above said carriage between a lower position and an upper position, a system for facilitating said cargo loading and unloading from said motor vehicle, comprising:

(a) a power source;

(b) a manually actuated control for energizing and deenergizing said power source;

(c) a pair of rear assemblies;

(d) each of said assemblies including a hydraulic cylinder having a shell and a piston, a pulley, and a substantially constant length chain;

(e) said cylinders being mounted substantially horizontally on said carriage;

(f) each of said pulleys being mounted on said axle housing near one of each of said wheels;

(g) said pulleys being oriented such that their axes of rotation are substantially perpendicular to said axles and substantially perpendicular to the plane of motion of said motor vehicle;

(h) a first end of each of said chains being attached to the end of one of each of said pistons;

(i) each of said chains being directed by one of said pulleys and attached to the underside of said body approximately above said wheel corresponding to said pulley;

(j) the length of each of said chains being such that said chain is nearly fully extended when said corresponding cylinder and said corresponding suspension component are fully extended;

(k) the displacement of each of said cylinders being at least long enough to fully compress said corresponding suspension component;

(l) the pulling power of each of said cylinders being at least the amount of power necessary to fully compress said corresponding suspension component;

(m) said power source including a means for pumping hydraulic fluid into and out of said hydraulic cylinders;

(n) said manually actuated control including an electrical switch and control circuitry;

(o) whereby, when said system is activated, said cylinders pull said chains, causing said suspension components to compress, thus lowering said vehicle body.

\* \* \* \* \*